(12) United States Patent
Ham et al.

(10) Patent No.: US 6,375,411 B1
(45) Date of Patent: Apr. 23, 2002

(54) FLUID DISPLACEMENT APPARATUS

(75) Inventors: David M Ham; Colin J Waterhouse; Jonathan C Williams, all of Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 09/468,363

(22) Filed: Dec. 21, 1999

(30) Foreign Application Priority Data

Dec. 24, 1998 (GB) .............................................. 9828666

(51) Int. Cl.$^7$ ........................... F04D 15/00; F04D 27/00
(52) U.S. Cl. .............................. 415/10; 415/14; 415/26; 415/173.1
(58) Field of Search ...................... 415/10, 26, 173.1, 415/173.6, 173.7, 173.2, 14, 173.3, 118; 384/446, 448; 417/356; 310/90.5; 277/410, 378

(56) References Cited

U.S. PATENT DOCUMENTS

| 3,938,913 A | * | 2/1976 | Isenberg et al. | ............ 417/356 |
|---|---|---|---|---|
| 4,688,998 A | * | 8/1987 | Olsen et al. | ................. 417/356 |
| 5,263,816 A | * | 11/1993 | Weimer et al. | .......... 415/173.1 |
| 5,658,125 A | * | 8/1997 | Burns et al. | .................... 415/26 |
| 6,220,602 B1 | * | 4/2001 | Webster et al. | .............. 277/410 |

FOREIGN PATENT DOCUMENTS

DE          1413835 A     11/1975

\* cited by examiner

Primary Examiner—Christopher Verdier
Assistant Examiner—Richard Woo
(74) Attorney, Agent, or Firm—Oliff & Berridge, PLC

(57) ABSTRACT

A gas turbine engine (10) has a compressor (14) which includes a rotary stage (16) supported for rotation by a plurality of wire wound stators (34). When the stators (34) are electrically energised, they exert Maxwell type magnetic forces on a magnetically permeable ring (18) joining the tips of compressor blades (21) in the stage (16), and lift it into a position in space where it can rotate on a common axis with the turbine of the engine (10).

5 Claims, 1 Drawing Sheet

200
FLUID DISPLACEMENT APPARATUS

BACKGROUND OF THE INVENTION

1. Field of Invention

The present invention relates to fluid displacement apparatus of the kind comprising relatively rotatable parts which, on relative rotation occurring, causes fluid to move.

2. Description of Related Art

The invention is particularly concerned with the suspension of the rotatable parts especially in a gas turbine engine compressor. Present day gas turbine engine technology includes shafts which rotate within fixed structure, and are supported therefrom via ball and roller bearings. The support mode necessitates the use of oil pumps, galleries, scavenge pumps, oil coolers and reservoirs, which adds considerably to design complexity, weight and cost. Consequently, the present invention seeks to provide gas turbine engine fluid displacement apparatus, which obviates that need in toto.

SUMMARY OF THE INVENTION

According to the present invention, gas turbine engine fluid displacement apparatus comprises a ring and a drum, the ring being held co-axially with and around the drum by a circular array of blades, the ring being magnetically permeable, and In turn surrounded by a casing, through which a circular array of electromagnetic stators comprising wire wound poles protrude, a stator power supply, and sensors for sensing the magnitude of any gap between the stators and ring, and generating signals therefrom, and control means connected between said sensors and said stator power supply, so as to receive any said signals and so cause said power supply to power one or more stator windings in a manner which will result in one or more stator poles generating sufficient magnetism across appropriate gaps as to cause the fluid displacement apparatus to adapt a position wherein said ring is equidistant from all said stator poles.

The invention will now be described, by way of example and with reference to the accompanying drawings in which:

DETAILED DESCRIPTION OF THE PREFERRED EMBODIMENTS

Figure 1:
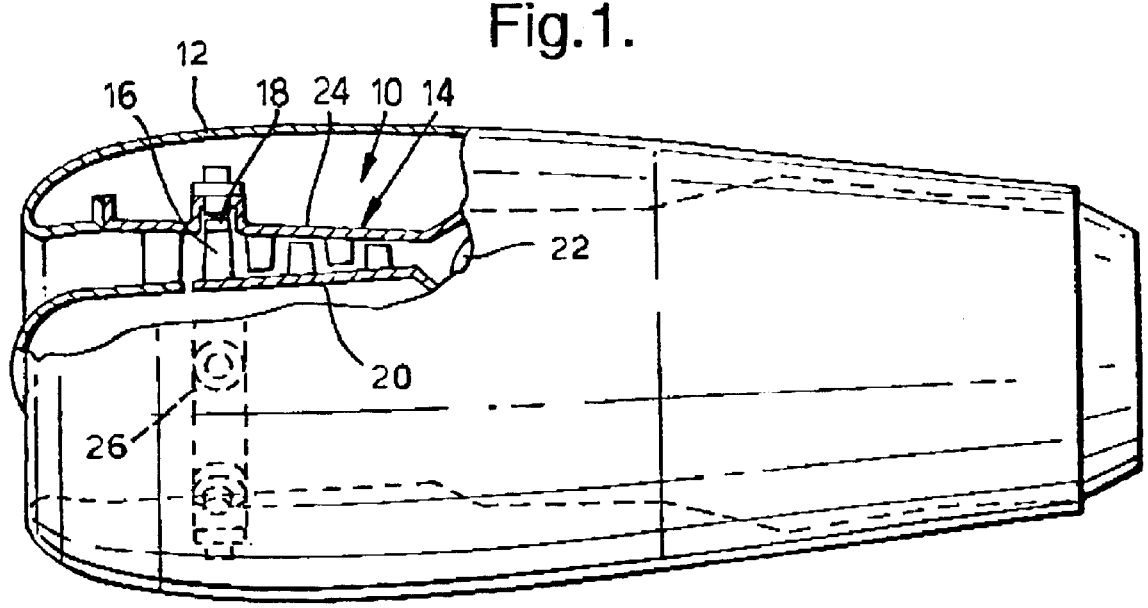
FIG. 1 is a diagrammatic, part axial cross sectional view of a gas turbine engine incorporating an example of the present invention.

Referring to FIG. 1 a gas turbine engine 10 is enclosed in a streamlined casing 12. A multi-stage compressor 14 is fitted to the upstream end of the engine 10 in known manner. In the present example, a first, rotary stage of compressor blades 16, comprises a ring 18 and a drum 20 which is held in co-axial, radially spaced relationship within ring 18, by a plurality of blades 21. The ring 18 is of short axial length, the ring may or may not be fibre reinforced to increase its strength. The drum 20 however, extends downstream, bypassing the combustion equipment 22, and terminates at a connection (not shown) with a turbine stage (not shown).

Figure 2:
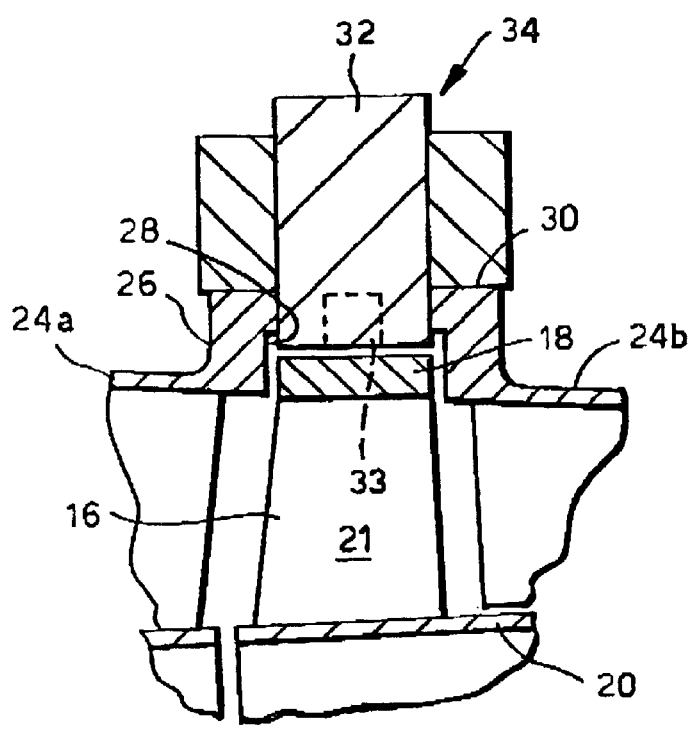
FIG. 2 is an enlarged part view of the engine of FIG. 1.

Referring now to FIG. 2 the material, from which ring 18 is made, contains sufficient iron as to be magnetically permeable. The drum 20 is made from any material which will withstand the stresses imposed upon it, during operation of engine 10.

An outer casing 24 surrounds all of the rotor and stator blades of the compressor 14 In known manner. However, the casing 24 has a thickened band 26 around it, in the plane of the blade stage 16. The band 26 has an annular recess 28 formed internally thereof, and a plurality of flats 30 formed on Its outer diameter, the flats 30 being spaced apart equidistantly around the circumference of casing 24 and band 26. The band 26 is drilled through the flats 30, into the annulus 28 at a plurality of locations to receive the ends of pole pieces 32 of a stator 34 fitted in each resulting hole. Each pole piece end is dimensioned such that its radially inner face protrudes Into the annulus 28. Interdigitated with pole pieces 32 are a plurality of sensors 33 which are sensitive to the radial gap between the rotary ring 18 and the stationary pole pieces 32 belonging to stator 34. Each sensor 33 generates an output signal in response to the magnitude of its associated radial gap.

The radial position of the outer magnetically permeable ring 18 in its running position also places It within the annulus 28 at an even, close radial spacing.

In order to achieve the assembly as described hereinbefore, it may be necessary to form the compressor casing 24 in two parts 24a and 24b, and then, having fitted the blade stage 16, along with its associated ring 18 and drum 20, in casing portion 24b, to clamp parts 24a and 24b together by any suitable means. The stat or pole pieces 32 may then be inserted in respective drilled holes.

When the blade stage 16 is stationary the ring 18 will rest on the pole pieces 32 in the lowest quadrant of the casing 24. In order to achieve rotation of the stage 16, it must first be levitated and centralised with respect to the ends of all of the pole pieces 32, so that it is co-axial with the rotational axis of engine 10. To this end, the wire windings of the upper pole pieces 32 are electrically energised by a power source (not shown) such that magnetic forces, of the kind known as Maxwell forces, are generated across the Saps between the ring 18 and the ends of the upper pole pieces 32. These Maxwell forces magnetically repel the ring 18 so as to levitate and support it. The sensors 33 respond to the reducing gaps between the ring 18 and the upper pole pieces 32, and the correspondingly increasing gaps between the ring 18 and the lower pole pieces 32. When the sensor output signals indicate that all of the gaps are equal in magnitude or substantially equal rotation may be commenced. A power source controller (not shown) of any suitable type continues to receive sensor output signals to monitor all of the gaps during engine operation and to exercise control over the power source (not shown) to maintain the gaps equal around the stage circumference. Any attempt by the stage 16 to rotate eccentrically will be sensed, and appropriate signals sent via the controller (not shown) to the power source (not shown) to vary current through the pole piece windings to maintain Maxwell forces of appropriate magnitudes across the gaps, so as to restore the rotation of stage 16 on the desired axis.

When the gas turbine engine is de-activated by cutting off the fuel supply, the rotary machinery continues to windmill at a reducing rate, until air resistance and friction dissipates its momentum. During this time, the sensors 33 continue to monitor the gaps, and to cause the power source to maintain the stage 16 in suspension. When windmilling has ceased output from the power source is reduced at a rate which ensures that the stage 16 is lowered gently onto the lowest stator poles 32 without Incurring damage.

In the present example, the stage 16 is depicted as the first rotary stage of a multi-stage compressor. However, any rotary stage in such a compressor may be utilised as described herein. The drum 20, which as described hereinbefore, extends downstream (with respect to the direction of gas flow through the engine 10) may also be supported by electrically powered stators (not shown) spaced apart along its length, in a manner similar to that described hereinbefore with respect to stage 16, thus ensuring the co-axial rotation of the engine rotary system.

What is claimed is:

1. A fluid displacement apparatus comprising for use with a gas turbine engine comprising:

a single ring;

a drum;

a circular array of blades, the single ring being held co-axially with and around the drum by the circular array of blades;

a casing, the single ring being magnetically permeable and sur rounded by the casing;

a circular array of electromagnetic stators that include wire wound poles, the circular array of electromagnetic stator protruding from the casing;

a stator power supply;

sensors that sense a magnitude of any gap defined between the electromagnetic stators and the ring, the sensors generating a signal based on the gap; and a controller between the sensors and the stator power supply, the controller receiving signals from the sensors and causing the stator power supply to power at least one electro-magnetic stator of the array of electromagnetic stators such that at least one stator pole generates sufficient magnetism across appropriate gaps such that the ring is equidistant from all of the stator poles.

2. A fluid displacement apparatus as claimed in claim 1, wherein said casing has a thickened band thereabout, the interior of which has an annular recess therein, to receive said ring so that the inner surface of said ring, with the inner surface of said casing, forms a substantially continuous fluid flow path.

3. A fluid displacement apparatus as claimed in claim 2, wherein said thickened band has flats formed on its outer surface at equi-angularly spaced positions, said flats being drilled through to the interior of said annular recess, and each resulting hole contains a stator which protrudes into said annular recess.

4. A fluid displacement apparatus as claimed in claim 3, wherein said thickened band is scalloped between the flats so as to reduce the weight of the casing.

5. A gas turbine engine including the fluid displacement apparatus as claimed in claim 1.

* * * * *